United States Patent
Miller et al.

(10) Patent No.: US 10,741,891 B2
(45) Date of Patent: Aug. 11, 2020

(54) TRACTION BATTERY ASSEMBLY

(71) Applicant: Ford Global Technologies, LLC, Dearborn, MI (US)

(72) Inventors: Daniel Miller, Dearborn, MI (US); Evan Mascianica, Detroit, MI (US); Josef Dollison, Petersburg, MI (US); Jeremy Samborsky, Livonia, MI (US); Jason Sielaff, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 927 days.

(21) Appl. No.: 14/931,221

(22) Filed: Nov. 3, 2015

(65) Prior Publication Data
US 2017/0125858 A1  May 4, 2017

(51) Int. Cl.
| | | |
|---|---|---|
| *H01M 10/00* | (2006.01) | |
| *H01M 10/613* | (2014.01) | |
| *H01M 10/6567* | (2014.01) | |
| *H01M 10/6557* | (2014.01) | |
| *H01M 10/625* | (2014.01) | |
| *H01M 10/647* | (2014.01) | |
| *H01M 10/653* | (2014.01) | |
| *H01M 10/6568* | (2014.01) | |
| *B60K 6/28* | (2007.10) | |

(52) U.S. Cl.
CPC ............ *H01M 10/613* (2015.04); *B60K 6/28* (2013.01); *H01M 10/625* (2015.04); *H01M 10/647* (2015.04); *H01M 10/653* (2015.04); *H01M 10/6557* (2015.04); *H01M 10/6567* (2015.04); *H01M 10/6568* (2015.04); *B60Y 2200/90* (2013.01); *B60Y 2200/92* (2013.01); *B60Y 2400/112* (2013.01); *H01M 2220/20* (2013.01); *Y10S 903/907* (2013.01)

(58) Field of Classification Search
CPC ........... H01M 10/613; H01M 10/6567; H01M 10/625; H01M 10/647; H01M 10/6557; H01M 10/653; H01M 10/6568; H01M 2220/20; B60K 6/28; B60Y 2400/112; B60Y 2200/90; B60Y 2200/92; Y10S 903/907
See application file for complete search history.

(56) References Cited

U.S. PATENT DOCUMENTS

| | | | |
|---|---|---|---|
| 6,106,972 A | 8/2000 | Kokubo et al. | |
| 8,268,474 B2 | 9/2012 | Kim et al. | |
| 2004/0137313 A1* | 7/2004 | Jaura ..................... | H01M 10/63 429/62 |
| 2006/0115721 A1 | 6/2006 | Lee et al. | |
| 2009/0169978 A1 | 7/2009 | Smith et al. | |

(Continued)

FOREIGN PATENT DOCUMENTS

WO    2015036828 A1    3/2015

*Primary Examiner* — Nicholas P D'Aniello
(74) *Attorney, Agent, or Firm* — David Kelley; Brooks Kushman P.C.

(57) ABSTRACT

A traction battery for a vehicle includes a plurality of cells stacked in an array and having a dielectric material surrounding at least a portion of each of the cells. The cells are spaced apart to define a plurality of pockets interleaved with the cells. A manifold is connected to the array and is configured to circulate liquid coolant to each of the pockets such that the coolant directly contacts the dielectric material of each of the cells.

10 Claims, 6 Drawing Sheets

(56) References Cited

U.S. PATENT DOCUMENTS

| | | | |
|---|---|---|---|
| 2010/0136396 A1* | 6/2010 | Hermann | H01M 2/1077 |
| | | | 429/99 |
| 2013/0209858 A1 | 8/2013 | Schmitt et al. | |
| 2015/0221995 A1 | 8/2015 | Robert et al. | |
| 2015/0270586 A1 | 9/2015 | Wang et al. | |
| 2015/0280183 A1 | 10/2015 | Utley et al. | |
| 2016/0172727 A1 | 6/2016 | Chan et al. | |
| 2016/0204487 A1* | 7/2016 | Morioka | H01M 10/6563 |
| | | | 429/50 |

* cited by examiner

TRACTION BATTERY ASSEMBLY

TECHNICAL FIELD

The present disclosure relates to traction battery assemblies for motor vehicles that thermally regulate cells utilizing contact between a liquid coolant and the cells.

BACKGROUND

Vehicles such as battery-electric vehicles and hybrid-electric vehicles contain a traction battery assembly to act as an energy source for the vehicle. The traction battery may include components and systems to assist in managing vehicle performance and operations. The traction battery may also include high-voltage components, and may include an air or liquid thermal-management system to control the temperature of the battery.

SUMMARY

According to one embodiment, a traction battery for a vehicle includes a plurality of cells stacked in an array and having a dielectric material surrounding at least a portion of each of the cells. The cells are spaced apart to define a plurality of pockets interleaved with the cells. A manifold is connected to the array and is configured to circulate liquid coolant to each of the pockets such that the coolant directly contacts the dielectric material of each of the cells.

According to another embodiment, a traction battery includes a cell array having a plurality of cells stacked in a linear arrangement and spacers interleaved with the cells. Each of the spacers defines channeling extending completely through a thickness of the spacer. A manifold is connected to the array and is configured to circulate liquid coolant to the channeling of each of the spaces such that the coolant directly contacts each of the cells.

According to yet another embodiment, a traction battery includes a plurality of spacers each having a web with a pair of major faces and a border surrounding at least a portion of the web and having walls extending traversely to the major faces. The traction battery also includes a plurality of cells having a pair of major sides and minor sides extending therebetween. The cells are arranged in a stack with the spacers interleaved between adjacent cells such that each of the major faces are in contact with a corresponding one of the major sides. Each of the spacers defines channeling that extends completely through the web. A manifold is connected to the stack and is configured to circulate liquid coolant to the channeling of each of the spaces such that the coolant directly contacts the major side of each of the cells.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
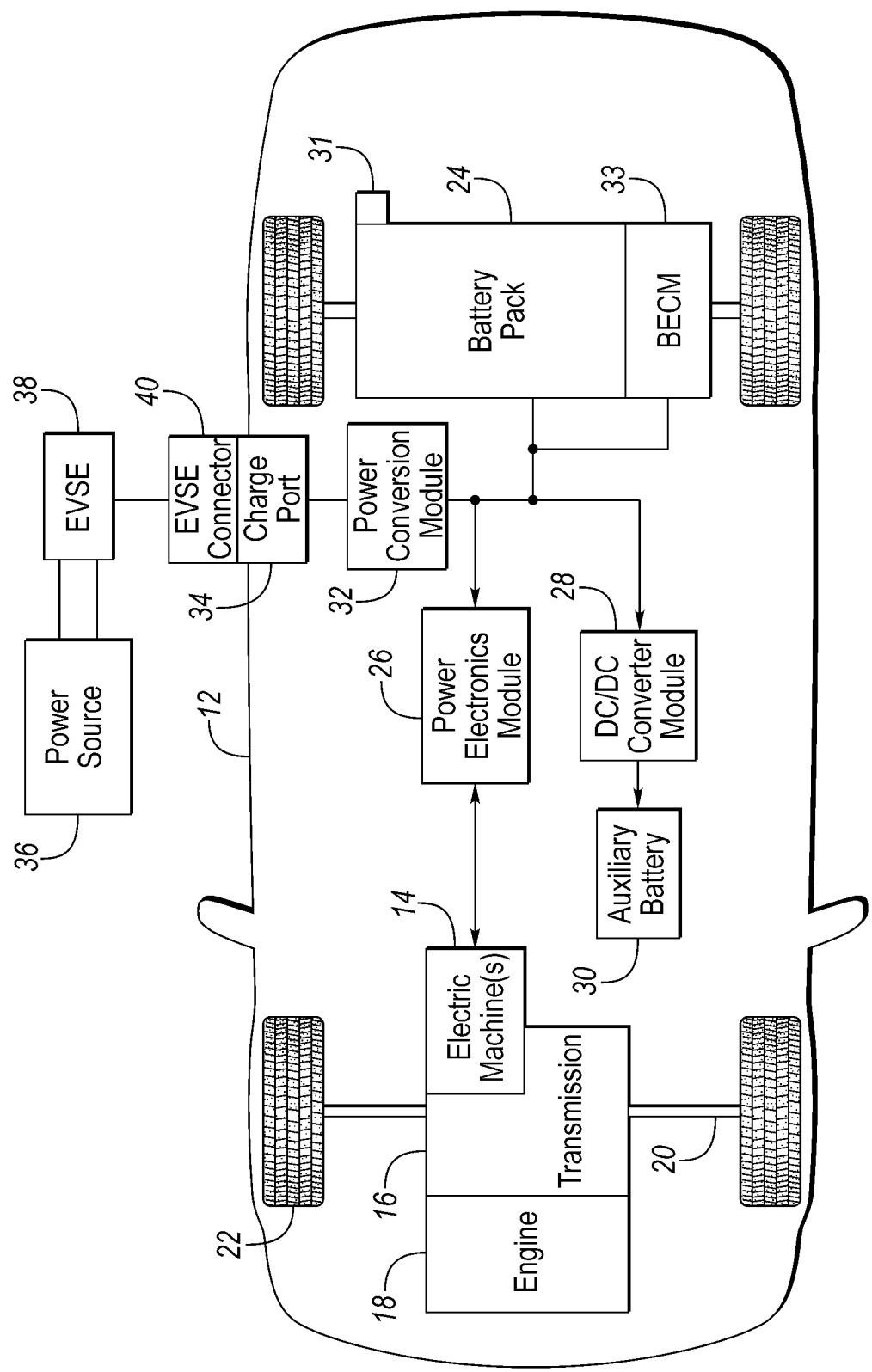
FIG. 1 is a schematic diagram of an example hybrid vehicle.

FIG. 1 depicts a schematic of a typical plug-in hybrid-electric vehicle (PHEV). Certain embodiments, however, may also be implemented within the context of non-plug-in hybrids and fully-electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A fraction battery or battery pack 24 stores energy that can be used by the electric machines 14. The fraction battery 24 typically provides a high voltage direct current (DC) output from one or more battery cell arrays, sometimes referred to as battery cell stacks, within the traction battery 24. The battery cell arrays may include one or more battery cells.

The battery cells, such as a prismatic, pouch, cylindrical, or any other type of cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Different battery pack configurations may be available to address individual vehicle variables including packaging constraints and power requirements. The battery cells may be thermally regulated with a thermal management system. Examples of thermal management systems include air cooling systems, liquid cooling systems and a combination of air and liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a fully-electric vehicle. In a fully-electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by a charging station connected to an external power source 36. The external power source 36 may be electrically connected to electric vehicle supply equipment (EVSE) 38. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via dedicated electrical conduits.

Figure 2:
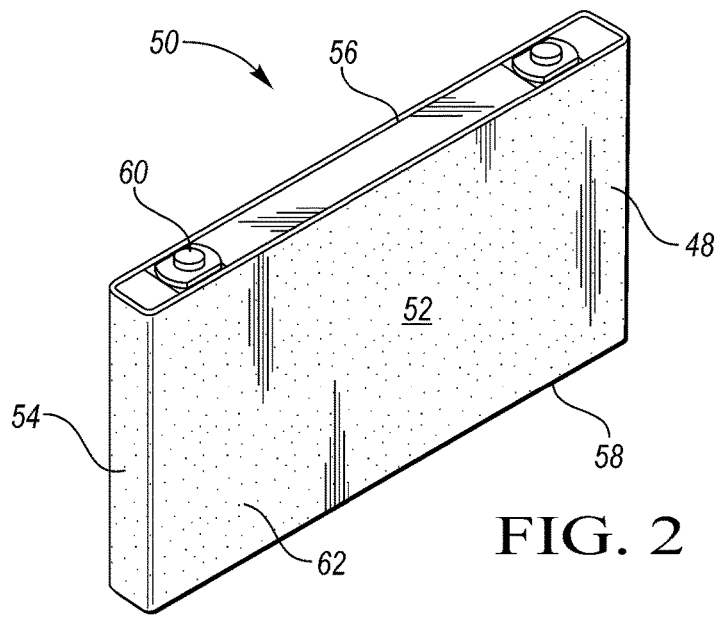
FIG. 2 is a perspective view of a prismatic battery cell.

FIGS. 2 through 11 and the related discussion describe examples of the traction battery assembly 24. Referring to FIG. 2, a battery cell 50 may be a prismatic cell having a can 48 defining major sides 52, minor sides 54, a terminal side 56, and a bottom side 58 that are interconnected along intersecting edges. The terminal side 56 includes one or more terminals 60 that may extend upwardly from the terminal side 56 allowing the terminals to be electrically and mechanically connected to busbars. The can 48 may be at least partially surrounded by a dielectric material 62. In the illustrated example, all of the sides of the cell 50 except for the terminal side are covered by the dielectric material 62. The dielectric material 62 prevents the electrically conductive cell from creating an electrical connection with unintended objects, such as adjacent cells. The dielectric material may be a pouch, film wrapping, paste, grease, tape, or similar item.

Figure 3:
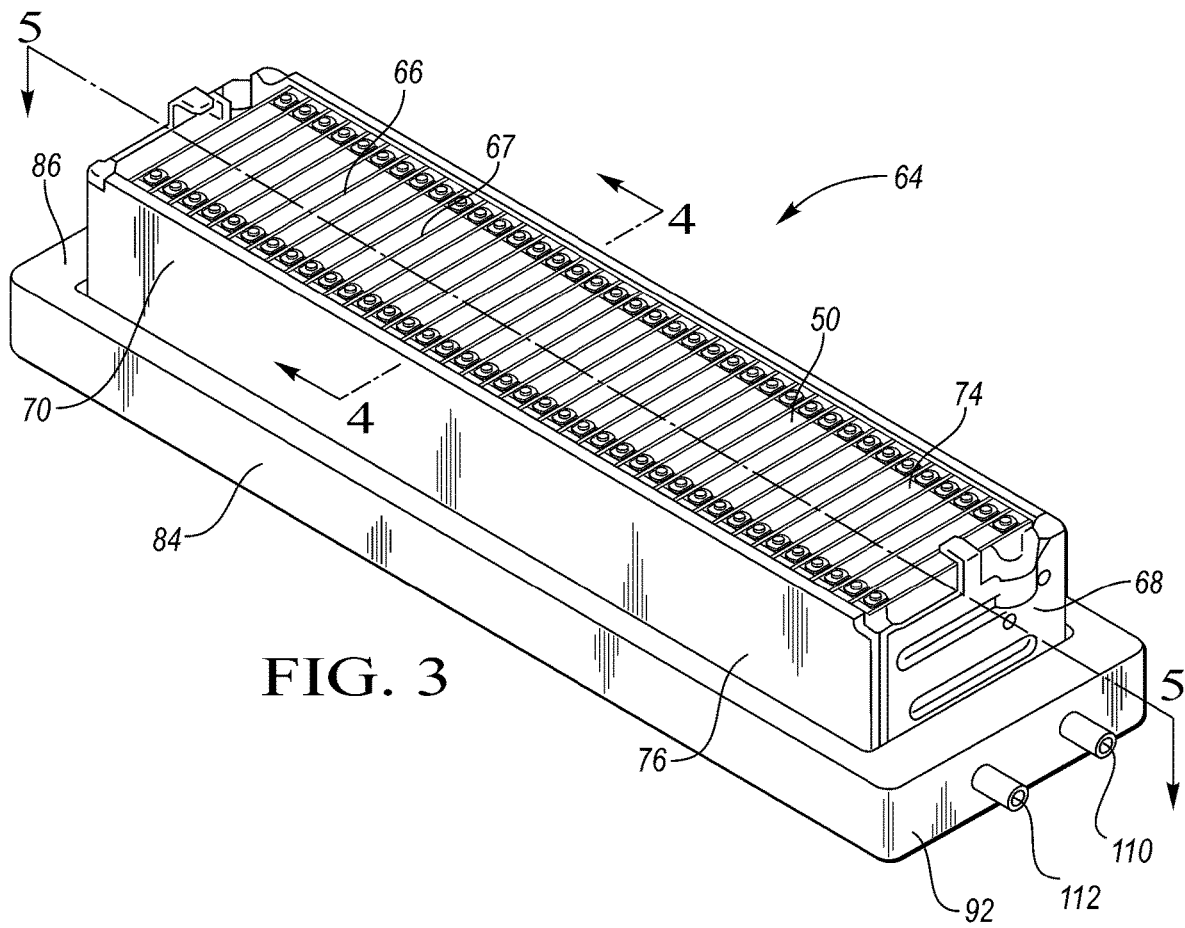
FIG. 3 is a perspective view of an example traction battery.
Figure 4:
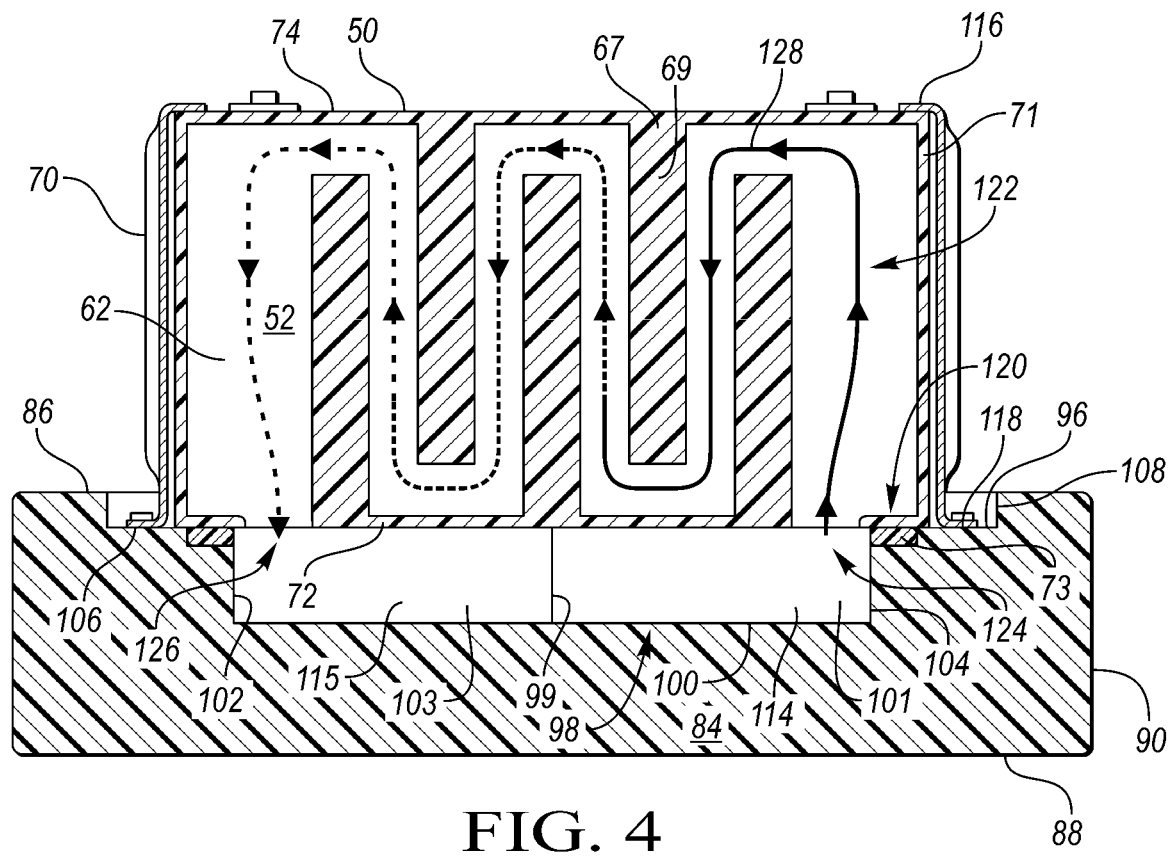
FIG. 4 is a front view, in cross section, of the traction battery shown in FIG. 3 along cut line 4-4.
Figure 5:
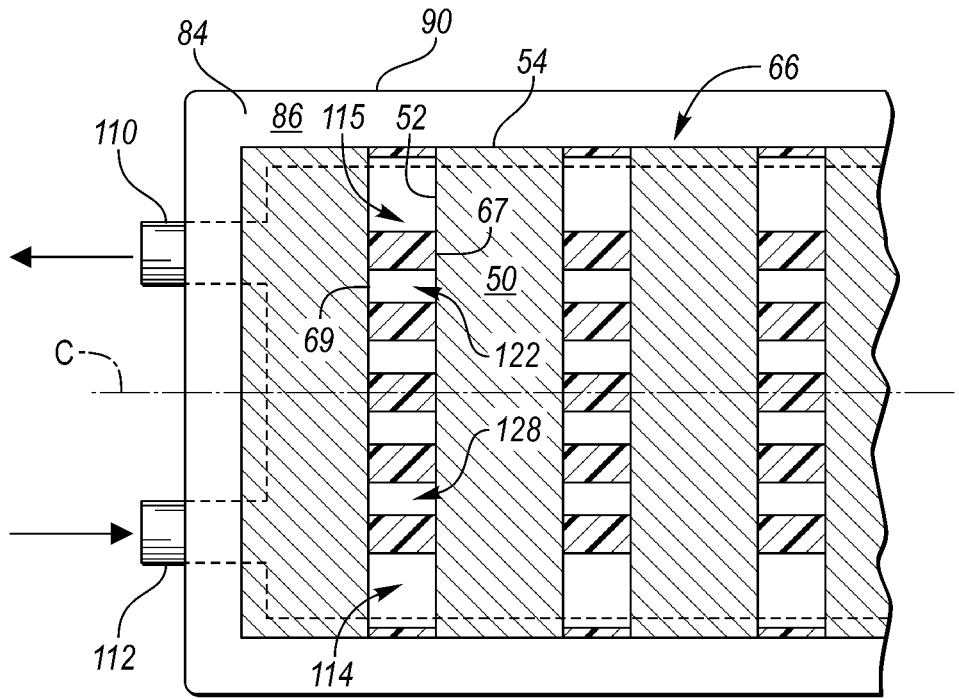
FIG. 5 is a partial top view, in cross section, of the traction battery shown in FIG. 3 along cut line 5-5 with the endplates and bracketry omitted for clarity.

Referring to FIGS. 3, 4, and 5, an example traction battery assembly 64 includes a plurality of cells, such as cells 50, stacked in a linear cell array (stack) 66. The cells are arranged in the array 66 such that the major sides 52 of adjacent cells face each other. A plurality of spacers 67 are interleaved between adjacent cells. Each of the spacers 67 includes a pair of major faces 69 and sidewalls 71 that extend between the major faces. The spacer 67 are interleaved with the cells 50 such that each of the major faces 69 is disposed against a major side 52 of a corresponding one of the cells 50.

The cells 50 and spacers 67 are held in the array by a pair of endplates 68 and bracketry 70 that connects the pair of endplates together. The endplates and bracketry 70 cooperate to compress the cells 50. The compression force applied may be between 0.5 to 4 kilo newtons (kN). The compression provided by the bracketry 70 and endplates 68 may create a liquid-tight seal between the cells 50 and the spacers 67. A sealant may be applied between the cells and spacers to further ensure a water-tight seal between the cells and spacers. The sealant may be a gasket, silicone (such as room temperature vulcanizing (RTV) sealant), paste, adhesive, or a thermal-interface material (TIM). The array 66 may be arranged such that the bracketry 70 is in contact with the minor sides 54 of the cells 50 and the endplates 68 are each in contact with a major side 52 of one of the first or last cells in the stack. The bracketry 70 may be a planar sheet (as shown) or may be a plurality of rod-like members. The array 66 may include a bottom side 72, a top side 74, and longitudinal sidewalls 76.

The traction battery 64 also includes a tray 84 and a manifold. In some embodiments (such as the one shown in FIGS. 3 and 4), the tray and manifold are a single component designed to accomplish both tasks. In the illustrated embodiment, the tray 84 is on the bottom of the traction battery 64 and supports the array 66. In other embodiments, the tray 84 may be on one of the sides 76, or on the top 74, of the array 66. The tray 84 includes a top 86, a bottom 88, longitudinal sidewalls 90, a front wall 92, and a back wall 94 interconnected to define a body. (It is to be understood that the terms "top," "bottom," etc. are for descriptive convention and that the battery may be packaged in a multitude of different orientations on the vehicle.) The top 86 has an outer surface 96 that defines an open channel 98 recessed into the top 86. The open channel 98 may extend longitudinally along a majority of the length of the tray 84, and extend laterally along a majority of the width the tray 84. The size of the channel 98 may approximate the size of the bottom 72 (or other side depending on the embodiment) of the array 66, albeit slightly smaller. The open channel 98 includes a bottom 100 and sidewalls 102, which define the boundaries of the channel 98. Some of the sidewalls 102 (of the illustrated embodiment) may be stepped to include a lower vertical face 104, a ledge 106, and an upper vertical face 108. The channel 98 may include a divider 99 that separates the channel 98 into an inlet channel 101 and an outlet channel 103. The inlet and outlet channels are interconnected in fluid communication allowing coolant to circulate from the inlet channel to the outlet channel. The front wall 92 may define an inlet port 110 of the inlet channel 101, and an outlet port 112 of the outlet channel 103.

The array 66 may be connected to the tray 84 such that the array 66 covers over the open channel 98. The array 66 is disposed against a top of the divider 99 to define an inlet coolant chamber 114 and an outlet coolant chamber 115. The coolant chambers are configured to circulate a liquid coolant (such as ethylene glycol) between the inlet port 110 and the outlet port 112 to thermally regulate the cells 50. The coolant chambers 114, 115 are defined by the cooperation between the tray 84 and the bottom side 72 of the array 66. Thus, the bottom side 72 of the array (which is composed of a collection of the bottoms of each of the cells) is in direct contact with the liquid coolant. Used herein, the term "direct contact" describes a situation where the liquid coolant contacts the can of the cell, and describes situations where the liquid coolant contacts the dielectric cover 62. During operation, a relatively cold coolant is circulated across the bottom of each of the cells to remove heat from the array to maintain the cell temperature within a desired range. The traction battery 64 may also be configured to heat the cells by circulating a relatively warm coolant across the bottom of each of cells 50 to add heat to the array 66.

The array 66 is also designed to circulate coolant across the major sides 52 of the cells 50 to increase the transfer of thermal energy between the cells 50 and the coolant. The spacers 67 may be designed to form one or more channels (or pockets) between the major sides 52 of adjacent cells. Coolant can be circulated through the channels allowing the coolant to directly contact the major sides 52 and cool the cells. In the illustrated embodiment, the spacers 67 define channeling 122 that extends between the major faces 69 creating a void completely through a thickness of the spacer 67. The channeling 122 is configured to circulate coolant therethrough. The channeling 122 includes an inlet 124 and an outlet 126 that are in fluid communication with the cooling chambers 114 and 115. A coolant flow path 128 extends between the inlet 124 and the outlet 126 through the channeling. The coolant flow path 128 may be serpentine in shape (as shown), or may be any other shape—such as a U-shaped.

Having the liquid coolant in direct contact with the cells reduces the thermal resistance of the cooling system compared to traditional cold plate designs by eliminating the thermal resistance of the cold-plate top and the thermal resistance of the TIM from the system. This creates a more efficient heat transfer between the cells and the coolant.

In the illustrated embodiment, the bottom side 72 of the array 66 is disposed on the ledge 106. The bracketry 70 may include a hook 116 that grabs the terminal side 56, and a foot 118 that is mechanically fastened to the ledge 106 to attach the array 66 to the tray 84. Alternatively, the array 66 may be secured to the tray 84 via adhesive, or a combination of adhesive and mechanical fasteners. The interface 120 between the array 66 and the tray 84 must be liquid-tight to prevent coolant from leaking out of the cooling chambers 114, 115. To prevent leakage, a sealant 73 may be applied at the interface 120. The sealant may be a gasket, silicone (such RTV sealant), paste, adhesive, or the like.

Figure 6:
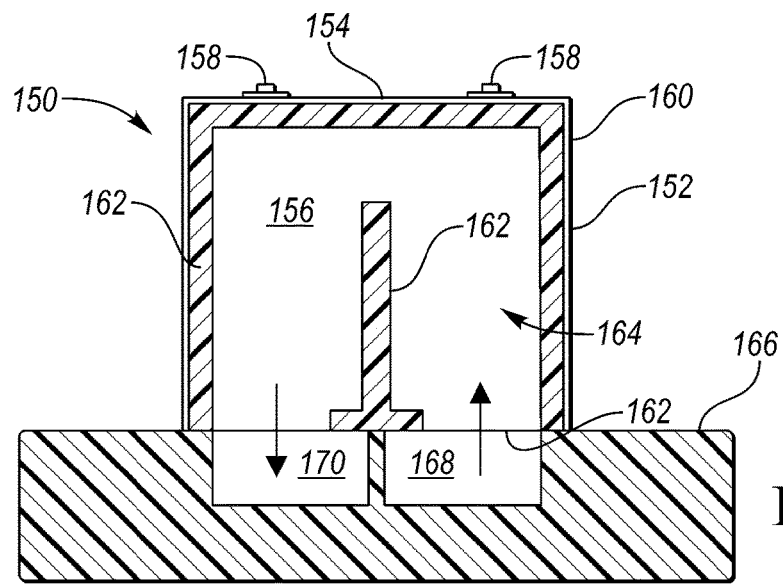
FIG. 6 is a front view, in cross section, of another traction battery.

Referring to FIG. 6, another traction battery 150 is illustrated. The traction battery 150 includes a cell array 152 including a plurality of cells 154. Each of the cells includes a pair of major sides 156, and terminals 158 extending from the cell. The cells may be arranged in a linear stack such that the major sides 156 of adjacent cells face each other. The cells may be arranged in a spaced-apart relationship such that the major sides 156 of adjacent cells define a gap. The gap may be created by a spacer. The spacer may be formed of hardened silicone 162. The silicone 162 may be RTV. The silicone 162 performs several functions including maintaining the gap and sealing the cells. The cells 154 and the silicone 162 cooperate to define pockets 164 disposed between the cells. The pockets 164 are configured to circulate liquid coolant therethrough to cool or heat the cells. The liquid coolant is in direct contact with the major sides 156. The major sides 156 and other portions of the cells 154 may include a dielectric coating in some embodiments. The traction battery 150 also includes a manifold 166 that supplies coolant to the pockets 164. The manifold 166 may define an inlet chamber 168 and an outlet chamber 170. In the illustrated embodiment, the manifold 166 also serves as the tray. The silicone 162 is arranged on the major sides 156 such that an inlet 172 and an outlet 174 are formed. The inlet 172 and the outlet 174 are in fluid communication with the manifold 166. During operation coolant is circulated from the inlet channel 168, through the pocket 164, and back into the outlet channel 170. The pocket 164 may have a simple U-shaped flow path as shown, or may include a more complex series of runs across the major sides 156.

Figure 7A:
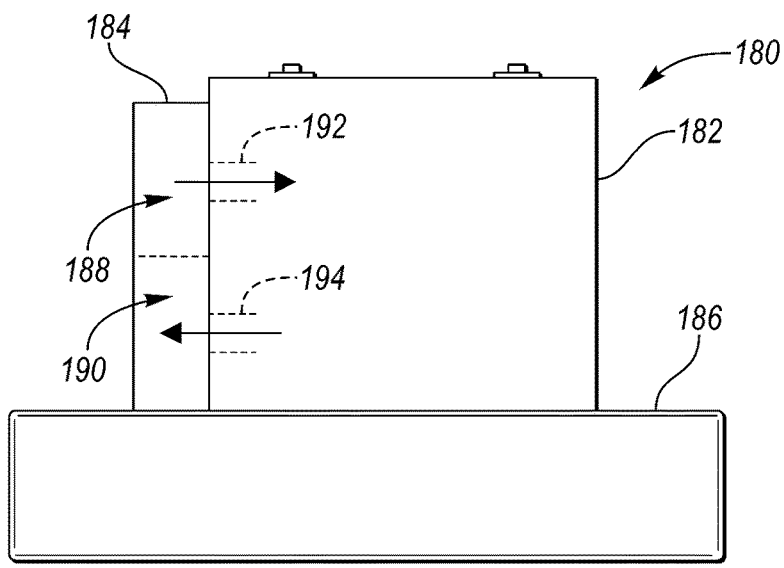
FIG. 7A is a diagrammatical front view of yet another traction battery.
Figure 7B:
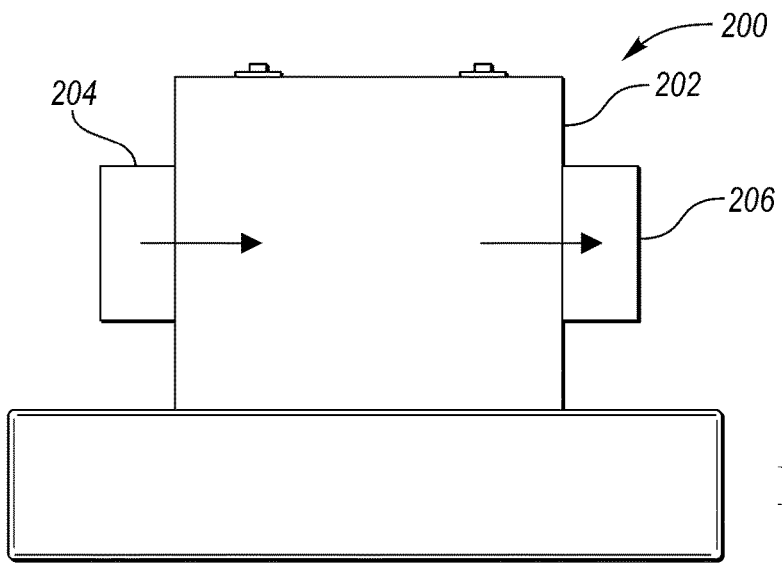
FIG. 7B is a diagrammatical front view of a traction battery according to an alternative embodiment.

Referring to FIG. 7A, another traction battery 180 includes a cell array 182 supported on a tray 186. A manifold 184 is disposed against one side of the array 182 and is configured to provide coolant to the cell array 182. The manifold 184 may include an inlet chamber 188 and an outlet chamber 190 in fluid communication with pockets disposed between adjacent cells of the cell array 182. Each of the pockets may include an inlet port 192 opening into the inlet chamber 188, and an outlet port 194 opening into the outlet chamber 190.

In an alternative embodiment (shown in FIG. 7B), a traction battery 200 includes a cell array 202 having a plurality of cells and pockets interleaved with the cells. The traction battery 200 includes an inlet manifold 204 disposed on one side of the array 202, and an outlet manifold 206 disposed on an opposite side of the array. In operation, coolant is circulated from the inlet manifold 204, through the pockets, and into the outlet manifold 206 in order to cool or heat the cells.

Figure 8:
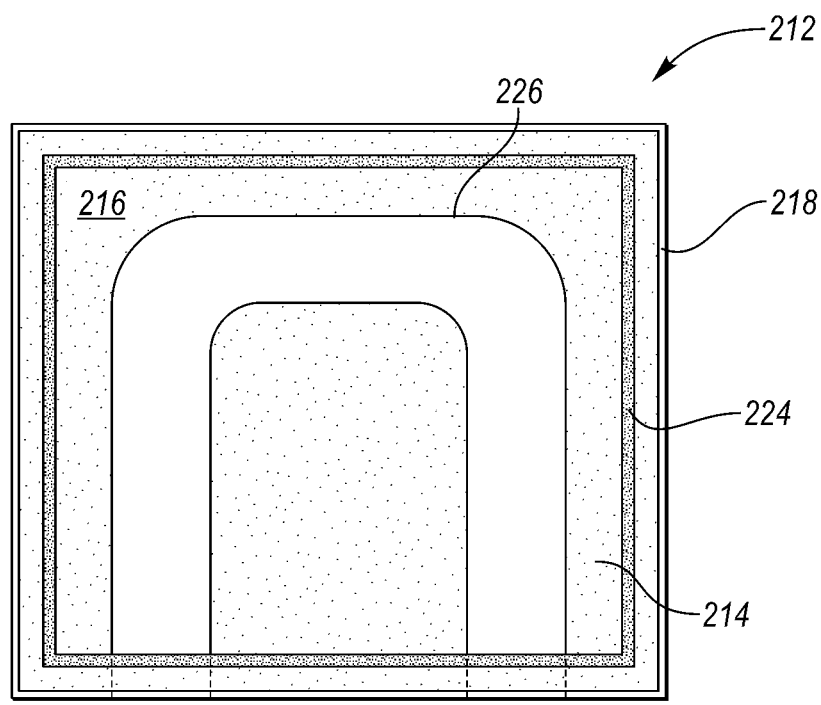
FIG. 8 is a front view of a cell spacer according to one embodiment.
Figure 9:
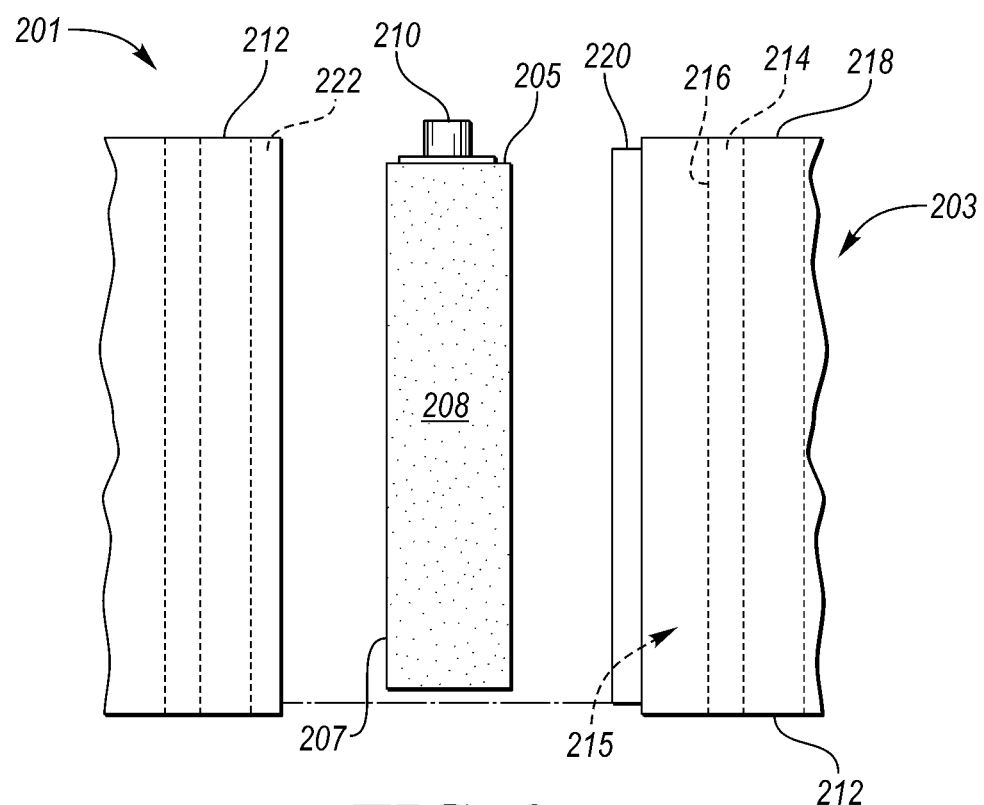
FIG. 9 is an exploded side view of a portion of a fraction battery including the cell spacer shown in FIG. 8.

Referring to FIGS. 8 and 9, yet another fraction battery 201 includes a shingled spacer arrangement, where adjacent spacers cooperate to create a compression fit in order to maintain a sealed surface internal to the coolant path. The traction battery 201 may be similar to the above traction batteries, in that, coolant is circulated directly across the major faces 207 of each of cells 205 of the array 203. Each spacer 212 includes a planar web 214 and border walls 218 that surround the web. Each web 214 defines major faces 216. The border walls 218 generally extend transversely to the major faces 216 and define a cavity 215 for receiving a portion of one of the cells 205. When the cell 205 is disposed within the cavity 215 the major faces 216 are disposed against the major sides 207 of the cells and the border walls 218 are disposed against the minor sides 208 of the cells. A sealant may be disposed between the spacers 212 and the cells 205 to prevent coolant from leaking. For example, a sealant 224 may be disposed around a perimeter of the web 214. The sealant could be silicone, adhesive or a gasket.

The spacers 212 are designed such that adjacent spacers are compression fit together. Each of the spacers may be identical and include a projection 220 extending from one end of the border walls 218 and a receptacle 222 on the other end of the border walls 218. The spacers are arranged in the array 202 such that the projection of one spacer faces a receptacle of another spacer. When assembled, the projection 220 is received within the receptacle 222 of an adjacent spacer. The compression fit may be liquid tight to seal the coolant path. In some embodiments, a sealant may be applied in the receptacles or on the projections to increase the robustness of the liquid-tight seal.

The webs 214 define channeling 226 configured to circulate a liquid across the major sides 207 of the cells. The channeling 226 is in fluid communication with one or more manifolds configured to deliver, and carry away, coolant from the channeling 226. The channeling may be a U-shaped as shown, may be any other shape suitable for circulate liquid across the cell. One or more of the border walls 218 may define ports 228 that open into the channeling 226 and are in fluid communication with the at least one of manifold allowing coolant to flow into, and out of, the channeling 226.

Figure 10:
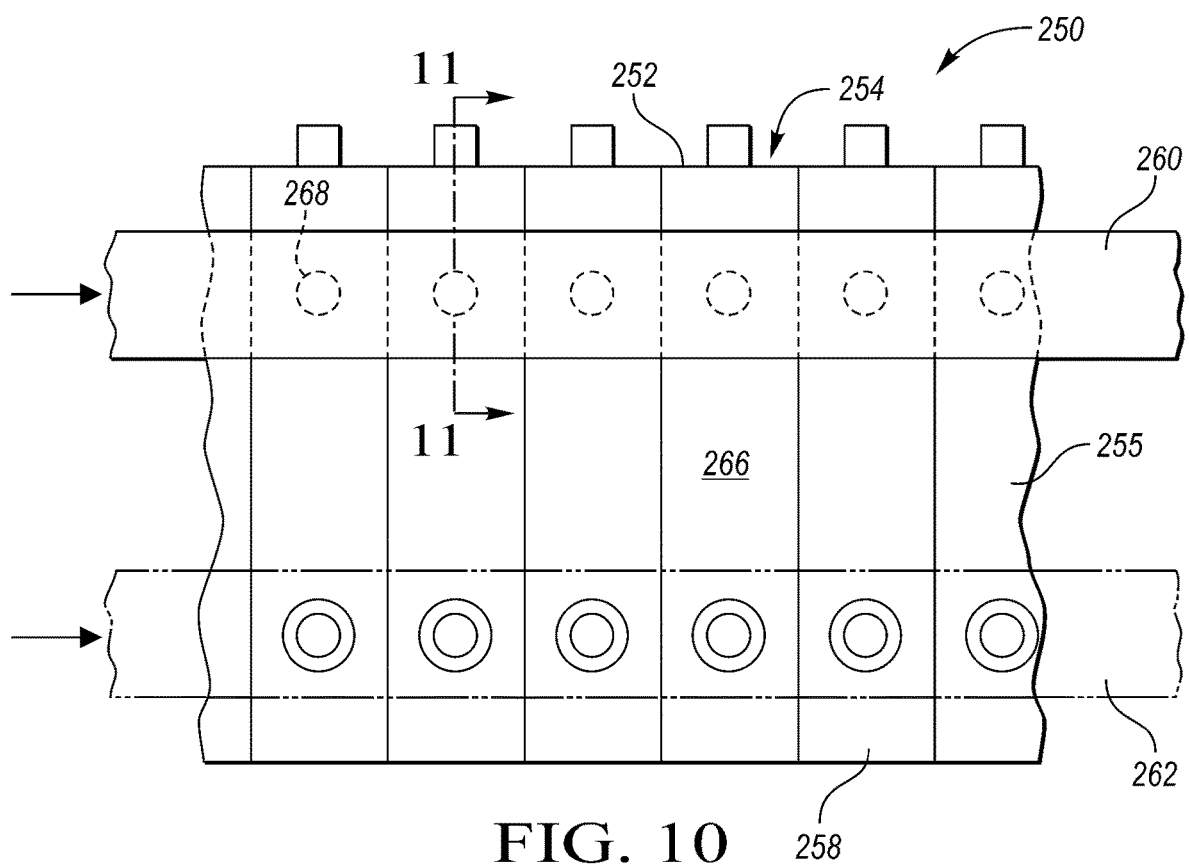
FIG. 10 is a side view of a traction battery according to a further embodiment.
Figure 11:
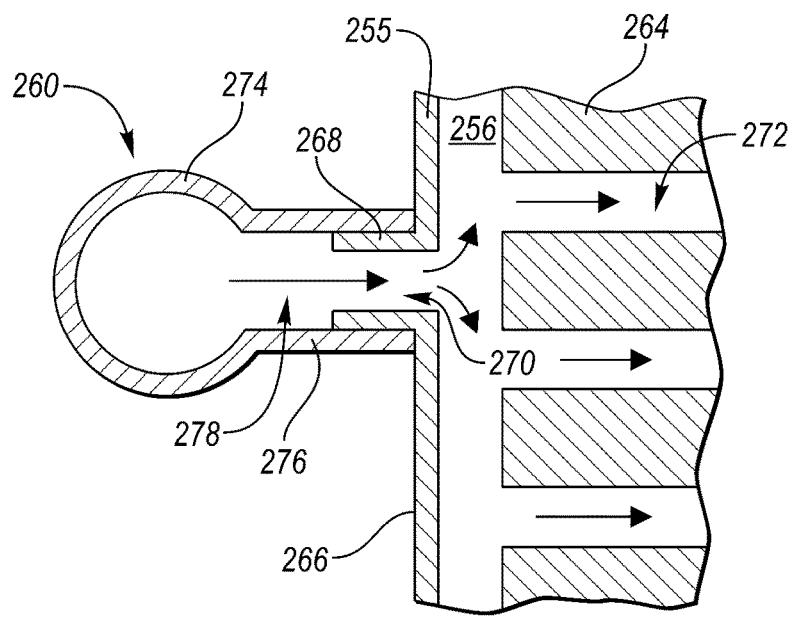
FIG. 11 is a front view, in cross section, of a portion of the traction battery of FIG. 10 along cut line 11-11.

Referring to FIGS. 10 and 11, another traction battery 250 includes an array 252 having cells 254 and spacers 255 that are interleaved with the cells. The spacers 255 maybe similar to the spacers 212 described above. In some embodiments, the shingled functionality may not be necessary and other means are employed to seal the spacers such as adhesive, silicone, gaskets, or other sealing means know to those skilled in the art. The cells 254 include major sides 256 that are disposed against a web 264 of the spacers 255. The cells 254 also include minor sides 258 extending between the major sides 256. The traction battery 250 may include an inlet manifold 260 and an outlet manifold 262 that each extends along the array 252 adjacent to the minor sides 258. The inlet manifold 260 is shown as present and the outlet manifold 262 is shown as omitted in phantom lines.

In one example embodiment, the manifold 260, 262 may be a conduit-style manifold having tubing, or the like, that carries coolant to the array 252. Referring to FIG. 11, the inlet manifold 260 may include a conduit 274 having strategically placed receptacles 276 that define a fluid port 278. The receptacles 276 are spaced to align with nipples 268 projecting outwardly from a sidewall 266 of each of the spacers 255. The nipples 268 define a fluid passage 270 that are in fluid communication with the channeling 272 defined in the web 264 of each spacer 255. The inlet manifold 260 is installed on the array 252 by pressing each of the receptacles 276 onto a corresponding nipple 268. The receptacles 276 may be a rubber material that seals against the nipples 268 creating a liquid-tight seal. The nipples 268 may include ridges for preventing the receptacles 276 from inadvertently pulling off the nipples. It is to be understood that the conduit-style manifolds shown in FIGS. 10 and 11 are also applicable to the other traction batteries previously described.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery comprising:
an array including cells linearly stacked and spacers interleaved with the cells, each spacer defining channeling extending completely through a thickness of the spacer; and
a manifold defining a recessed open channel extending a length of the array and configured to circulate liquid coolant to the channeling to directly contact the cells, wherein the manifold is connected to the array with the array covering the channel to define a coolant chamber.

2. The traction battery of claim 1 wherein each of the cells further includes a dielectric material surrounding at least a portion of each of the cells, and the coolant directly contacts the dielectric material of each of the cells.

3. The traction battery of claim 1 wherein the manifold is a tray having a body defining the open channel.

4. The traction battery of claim 1 wherein the channeling of each of the spacers further includes an inlet and an outlet, and defines a coolant flow path between the inlet and outlet.

5. The traction battery of claim 1 further comprising a sealant disposed between a major face of the spacer and a major side of a corresponding one of the cells creating a liquid-tight seal.

6. The traction battery of claim 5 wherein the sealant is a gasket or silicone.

7. The traction battery of claim 1 further comprising a divider disposed in the recessed open channel to separate the coolant chamber into an inlet chamber and an outlet chamber.

8. A traction battery comprising:
a linear array including prismatic cells, and spacers each disposed between an adjacent pair of the cells and defining channeling extending completely through a thickness of the spacer so that surfaces of the pair cooperate with the channeling to define a coolant path in direct contact with the surfaces; and
a manifold extending along and connected to an outer side of the array and in fluid communication with the coolant paths.

9. The traction battery of claim 8 wherein the manifold defines an open channel, and the array further includes a side that covers the channel to define a coolant chamber that is in fluid communication with the coolant paths, wherein the side of the array defines a boundary of the coolant chamber.

10. The traction battery of claim 8 wherein the coolant paths are liquid coolant paths.

* * * * *